Oct. 4, 1966          W. W. KENNEDY          3,276,480

REGULATOR FOR CONSTANT VOLUME OF GAS FLOW

Filed July 1, 1965          6 Sheets-Sheet 1

Fig. 1.

INVENTOR.
Walter W. Kennedy
BY
Wolfe, Hubbard, Voit & Osann
ATTORNEYS

Oct. 4, 1966  W. W. KENNEDY  3,276,480
REGULATOR FOR CONSTANT VOLUME OF GAS FLOW
Filed July 1, 1965  6 Sheets-Sheet 3

INVENTOR.
Walter W. Kennedy
BY
ATTORNEYS

Oct. 4, 1966  W. W. KENNEDY  3,276,480

REGULATOR FOR CONSTANT VOLUME OF GAS FLOW

Filed July 1, 1965  6 Sheets-Sheet 6

INVENTOR.
WALTER W. KENNEDY
BY Wolfe, Hubbard,
Voit & Osann
ATTORNEYS

United States Patent Office 3,276,480
Patented Oct. 4, 1966

3,276,480
REGULATOR FOR CONSTANT VOLUME OF GAS FLOW
Walter W. Kennedy, Rockford, Ill., assignor to Barber-Colman Company, Rockford, Ill., a corporation of Illinois
Filed July 1, 1965, Ser. No. 470,336
14 Claims. (Cl. 138—45)

This application is a continuation-in-part of my copending application Serial No. 309,564, filed September 17, 1963, and relates to a regulator to automatically control the flow of gas through a duct to maintain a constant volume delivery in spite of variations in the pressure differential inducing the flow through the duct.

More particularly, the invention constitutes an improvement in the regulator disclosed in Patent No. 3,049,146 in which the cross-section of the duct is divided by a longitudinally extending partition to provide a longitudinal air passage and an adjacent chamber closed at its downstream end to develop between the passage and chamber a static pressure differential which varies with the inlet air pressure and adjusts the transaxial position of the partition to vary the area of the passage and thus automatically maintain a constant volumetric rate of air flow through the duct.

The general object is to improve on regulators of the patented type and provide a similarly acting regulator which is simpler and less expensive in construction, possesses greater capacity for a given duct size, is quieter in operation, and more versatile in its application to ducts of different sizes and cross-sections.

A more detailed object is to extend the variable air flow passage longitudinally of the duct and define the same between two partitions movable toward and away from each other in response to changes in closed end static pressure chambers on opposite sides of the passage.

Another object is to support the partitions by a member which moves back and forth along the duct and is yieldably restrained to allow movement of the partitions transaxially toward and away from each other in response to increases and decreases in the air supply pressure.

A further object is to provide a construction of the above character in which the partitions comprise sheets of flexible material.

Another object of the invention is to provide a regulator of the above character usable in ducts of circular cross-section.

Still another object is to balance the static pressure differential by a spring force applied in a novel manner to the axially movable partition supporting member.

A further object is to define a plurality of longitudinal passages of variable area spaced apart transaxially of the duct between spaced static pressure chambers thereby reducing the required size of the individual partitions in ducts of relatively large sizes.

A related object is to define the static pressure chambers not only between a partition and a wall of the duct but also, when desired, between two flexible sheets supported to bulge away from each other into longitudinal passages on opposite sides of each chamber.

The invention also resides in the novel connection and mounting of the flexible sheets and in achieving a static pressure drop of optimum value for a given supply pressure.

Other objects and advantages of the invention will become apparent from the following detailed description taken in connection with the accompanying drawings, in which.

Flow regulators embodying the present invention are usable in ducts of different sizes and cross-sections, for example, a circular section as indicated at 10 in FIGS. 1 to 4, or a rectangular section 10' in the forms shown in FIGS 7 to 12. Air under a pressure of the magnitude commonly used in so-called high pressure air conditioning systems is delivered into the duit inlet through a supply pipe 11, usually somewhat smaller than the duct 10, and flows in the direction indicated by the arrows through the duct and an outlet pipe 12 leading to the distribution system.

In accordance with the present invention, the air passage 13 through the duct and varying in cross-section in response to changes in the supply pressure extends longitudinally along the duct axis and is defined between two opposed and sheet-like imperforate partitions 14 and 15 (FIGS. 1–4 and 14', 15', FIGS. 7–10) disposed within and extending along the duct and mounted for movement transversely of the duct toward and away from each other in response to changes in the static pressure differential between the air passage and chambers 16 closed at their downstream ends, said differential acting on said partitions to create an axially directed force balanced by a spring 17 extensible longitudinally of the duct.

Figure 1:
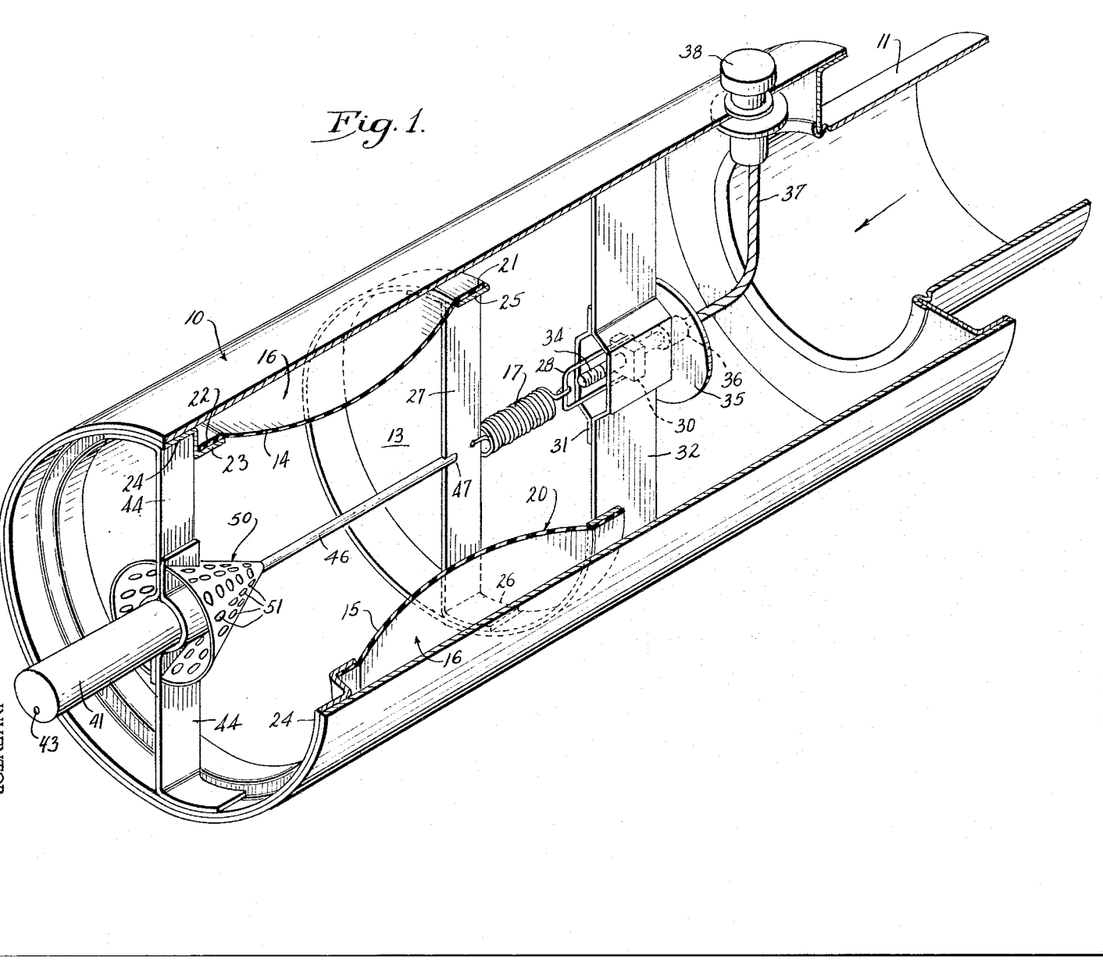
FIGURE 1 is a prespective view of the improved regulator with parts broken away.
Figure 2:
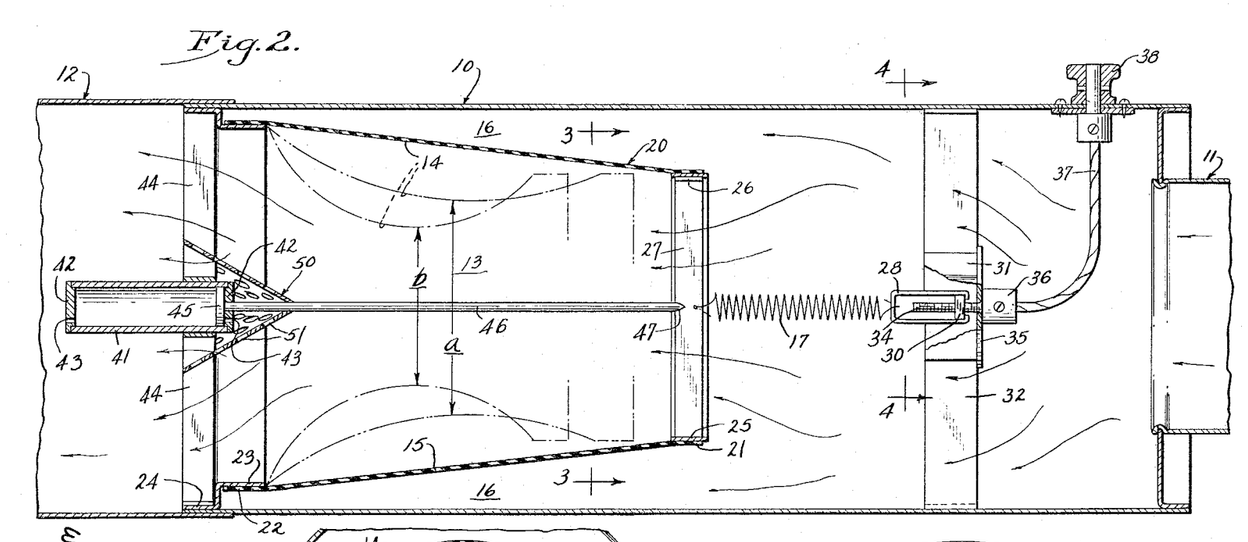
FIG. 2 is a fragmentary longitudinal section.
Figure 3:
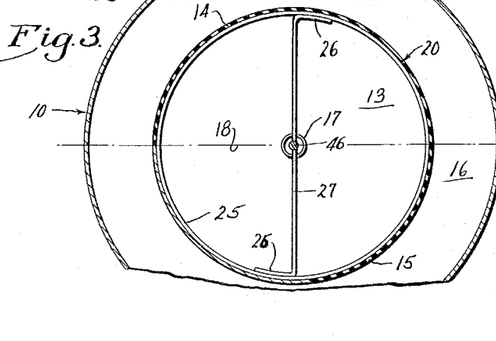
FIGS. 3 and 4 are fragmentary sections taken respectively along the lines 3—3 and 4—4 of FIG. 2.
Figure 4:
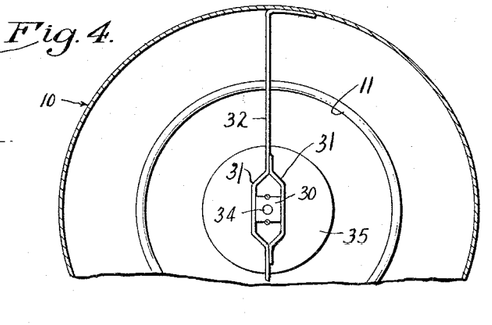

In the form shown in FIGS. 1 to 4, the improved air flow regulator is adapted for use in a cylindrical duct 10 and the partitions 14 and 15 are disposed on opposite sides of a diameter 18 of the duct and constitute the opposite halves of an integral tube 20 of imperforate readily flexible material smaller than the duct and extending along a substantial length of the latter. Each cross-section of the tube is circular as shown in FIGS. 3 and 4 and, in the present instance, the tube is of somewhat smaller diameter at its upstream end 21 than at the downstream end 22 which is telescoped with and cemented or otherwise bonded to the smaller end portion 23 of a sheet metal ring 24. The latter telescopes snugly within the duct and is welded or otherwise secured thereto so as to close the downstream end of the chamber 16 defined between the external surface of the tube 20 and the opposed internal wall of the duct 10, the chamber thus being circumferentially continuous.

The upstream end 21 of the tube is telescoped over and bonded to a cylindrical ring 25 somewhat smaller in diameter than the ring portion 23 and secured to opposite ends 26 of a diametrically extending bar 27 disposed edgewise to the air flow and supported for yielding movement back and forth along the axis of the duct 10 and the air passage 13 defined by the internal wall of the tube. Such support is formed, in this instance, by the spring 17 which is of the coiled contractile or extension type, extends along the duct axis, and is stretched between the crossbar 27 and a U-shaped member 28 secured at its upstream end to a nut 30 disposed between and held against turning by the guides 31 at the center of a bar 32. The latter extends diametrically across and its opposite ends are secured to the duct upstream from the smaller end 21 of the tube 20.

A screw 34 threaded through the nut is journaled in a plate 35 fixed to the crossbar 32, the screw being coupled by a collar 36 to the inner end of a flexible shaft 37 bent laterally and extended outwardly through and journaled in the duct wall. By manually turning a knob 38 on the outer end of the shaft, the nut may be advanced along the guides 31 to vary the stressing of the spring 17 and therefore the force stretching the tube 20 endwise. The latter is composed of relatively thin fabric impregnated with rubber or other fabrics so as to be impervious but nevertheless very flexible.

The plate 35 is centered on the duct axis and corresponds in shape to the cross-section of the duct and is substantially smaller in size than the upstream end of the tube 20. The plate thus constitutes a target spaced a substantial distance downstream from the inlet of the tube and the central air passage 13 so as to intercept the oncoming stream of air delivered through the duct inlet 11 and divert the air laterally and outwardly as indicated by the arrows in FIG. 2 and therefore toward the upstream end of the annular chamber 16 so that the static pressure in the latter will always correspond closely to the static pressure of the air delivered into the inlet of the duct.

In the form shown in FIG. 2, the diameter of the upstream end 21 of the tube 20 is about forty percent of the duct diameter. For this arrangement, the area of the target plate should be about thirty percent of that of the duct inlet when the latter is as shown substantially larger than the supply duct 11. The central portion of the oncoming air stream impinges against the plate, thus spreading the stream so as to direct the outer portion thereof toward the annular inlet of the static chamber 16, the remainder flowing around the target plate and into the inlet end of the tube 20 approximately as indicated by the arrows. The use of a target plate 35 is desirable where, as in the present instance, the supply 11 is somewhat smaller than the inlet of the duct 10 and and the air is supplied at so-called high pressure, for example, four inches of water, as is common nowadays in the air conditioning of many buildings.

OPERATION

With the arrangement above described, the flexible tube 20 will be drawn taut by the spring 17 and assume the shape shown in FIG. 2 when no air is being supplied through the pipe 11. Since the end 21 of the tube 20 is substantially smaller in cross-section than the duct 10, this end provides a restriction so that a portion of the static pressure at the duct inlet will be converted to velocity pressure causing a flow into and through the air passage 13 at a velocity somewhat greater than the velocity in the duct inlet. As is well known, this velocity increase is accompanied by a corresponding decrease in the static pressure within and also downstream from the restriction. The static pressure in the close ended chamber 16 remains substantially equal to that in the duct inlet.

Under the static pressure drop thus developed between the outside and the inside of the tube, the intermediate and unsupported length thereof is bulged inwardly all around its circumference as indicated at $a$ in FIG. 2. Such bulging is accompanied by movement of its free end 21 axially along the duct and downstream as permitted by further stretching of the spring. The bulging continues until the axially directed force due to the prevailing pressure drop just balances the force of the spring.

The inward bulging is accompanied by a progressive decreasing in the area of the passage 13 intermediate the ends of the tube 20 as indicated at $a$. When the area of this section becomes less than that of the inlet end of the tube, such section becomes the restriction for increasing the flow velocity and correspondingly reducing the static pressure that determines the prevailing pressure drop.

It will be apparent from the foregoing that the velocity of the air flow through the passage 13 at any time is determined by the prevailing area of the passage at the tube section $a$. This area in turn is determined by the static pressure drop developed under the prevailing supply pressure. The tube thus acts continuously as an automatic valve for reducing the flow area through the passage 13 as the supply pressure increases. Conversely, the flow area is increased as the supply pressure is decreased.

As a result of the action above described, the volumetric rate of flow of air delivered through the duct outlet is maintained constant at all times in spite of wide variations in the supply pressure.

Of course, the volume of air delivered at any time through the passage 13 is determined by the force exerted by the spring and tending to extend the tube 20 longitudinally. Thus, if the knob 38 is adjusted to advance the nut 30 downstream, the spring force is reduced correspondingly. Under this force, the same supply pressure that bulges the tube to a section $a$ may increase the section to a diameter $b$ when the changed force of the spring becomes balanced against the prevailing static pressure drop. This results in a corresponding reduction in the volumetric flow rate.

NOISE REDUCTION

Means is preferably provided for overcoming any tendency of the intermediate portion of the flexible tube 20 to flutter in service use and thus produce objectionable noise, such fluttering being accompanied in the present instance by axial vibration of the crossbar 27 supporting the free end 21 of the tube. The present construction thus lends itself to the use of a dashpot type of vibration dampener. Accordingly, a cylinder 41 extending along the axis of the duct is closed at opposite ends 42 except for orifices 43 and is secured intermediate its ends to the inner ends of bars 44 whose outer ends are secured to the ring 24. A piston 45 slidable in the cylinder is on an elongated rod 46 projecting upstream along the axis of the duct and to the center of the bar 27 to which the end of the rod is welded at 47.

The cylinder 41 is long enough to accommodate the full range of movement of the crossbar 27 and opening of the regulator outlet so that, in any position of the piston along the cylinder, the flow of air through the orifices 43 is restricted. The latter are sized to provide the resistance necessary to prevent objectionable axial vibration of the bar 27 and therefore radial fluttering of the tube 20.

If desired, additional means may be provided to assist in the elimination of noise. Such means may take the form of a small sheet metal cone 50 centered in the duct adjacent the outlet end of the tube 20 and arranged with its apex pointing upstream. Herein, the base of the cone is slotted to receive the bars 44 to which the cone is secured. With the surface of the cone thus diverging downstream, the central portion of the oncoming air stream will be diverted outwardly thus reducing eddy currents or other turbulence and providing a smoother flow of the air from the outlet. Preferably the cone is perforated by holes 51 to allow a portion of the air stream to flow along the duct axis thus providing a more even distribution of the air stream across the duct outlet beyond the outlet end of the tube 20.

MODIFICATION—FIGS. 5 AND 6

Figure 5:
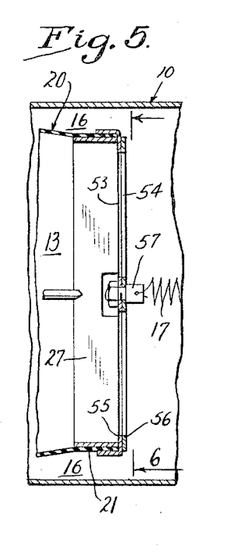
FIG. 5 is a fragmentary longitudinal section of a modified form on the invention.
Figure 6:
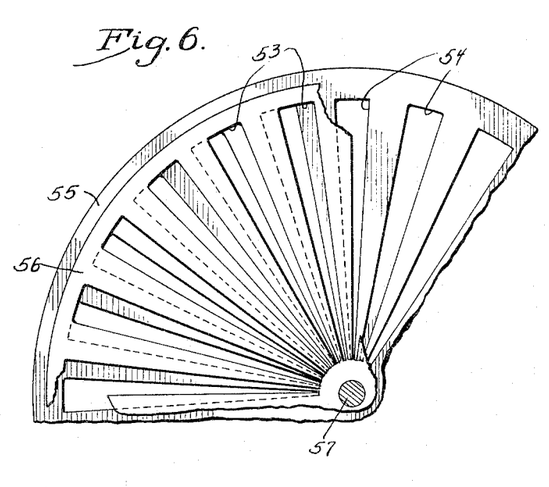
FIG. 6 is a fragmentary section taken along line 6—6 of FIG. 5.

This form of the invention is especially suited for use in installations in which the pressure of the air supply is relatively high and the volume of air used is comparatively small. For this purpose, the restriction in the duct at the upstream end 21 of the tube 20 is made adjustable in its effective area. In the present instance, the variable opening is achieved by bringing into different degrees of angular registration radially elongated holes 53 and 54 of segmental shape angularly spaced around two disks 55 and 56 respectively mounted to turn about the axis of the duct. The disk 55 is fixed to the upstream edge of the crossbar 27 while the disk 56 of the same size is journaled on a pin 57 fixed to the center of the disk 55 and forming the anchor for the downstream end of the spring 17 above described. By angular adjustment of the disk 56, the hole 53, 54 may be brought into different degrees of registration thus providing a combined area for causing the desired restriction of the air flow into the inlet end of the tube 20.

The combined area of the holes in each of the disks 55, 56 is approximately half the area of the inlet end of the tube 20. Also, with this arrangement, the end 21 of the tube may be made somewhat larger, for example, sixty percent of the area of the duct 10 as compared to the form first described.

MODIFICATION—FIGS. 8 TO 10

Figure 8:
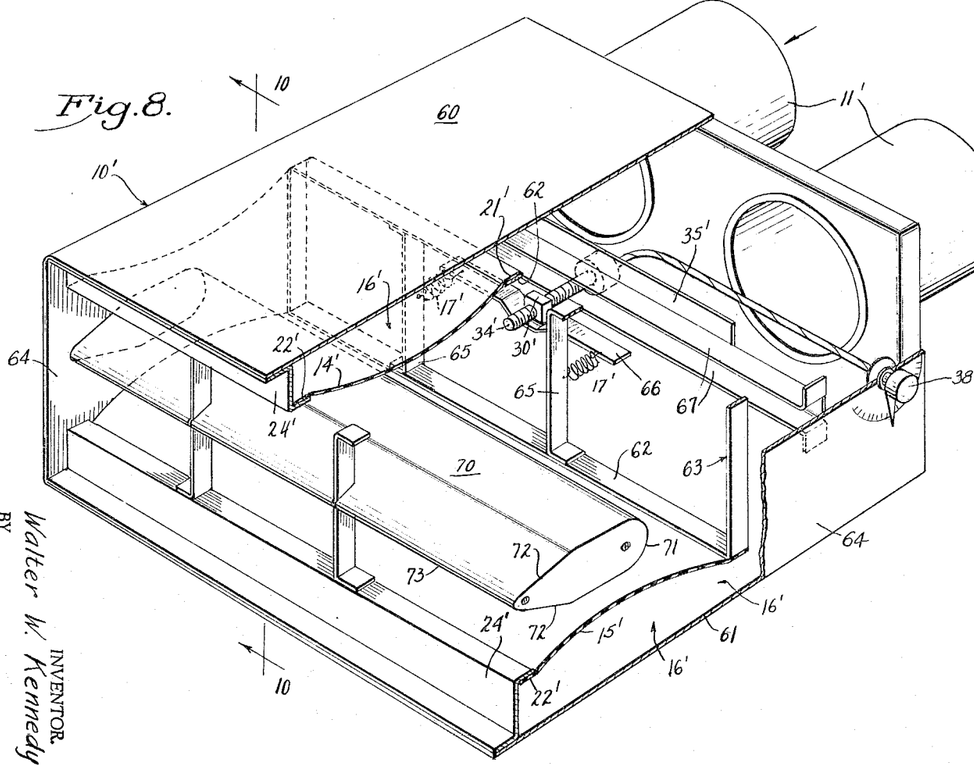
FIGS. 8 and 10 are views similar to FIGS. 1 and 2 showing another modification.
Figure 9:
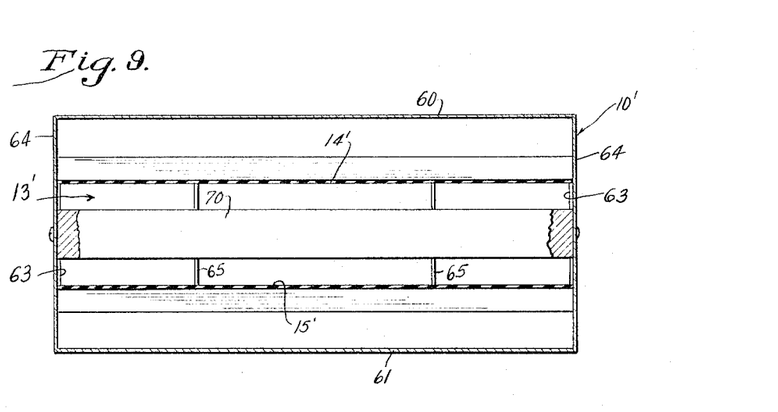
FIG. 9 is a section taken along the line 9—9 of FIG. 10.
Figure 10:
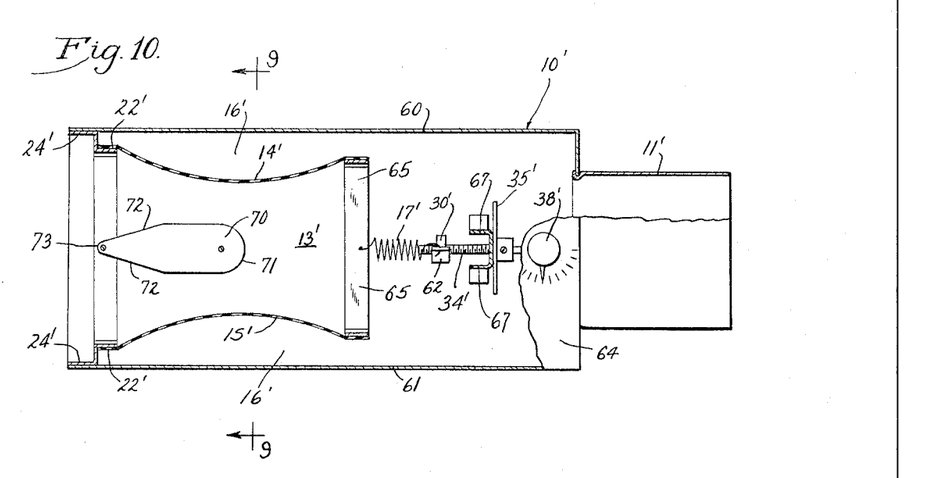

In this form, the parts corresponding to those of the form first described are indicated by the same but primed reference numerals. The duct 10' is of rectangular cross-section and in this instance is supplied with warm and cool air through two pipes 11' laterally spaced across the inlet end of the duct.

In view of the rectangular cross-section of the duct, the partitions 14' and 15' take the form of rectangular sheets composed of the same flexible material with their downstream ends 22' secured to crossbars 24' adjacent the top and bottom walls 60, 61. The upstream ends 21' are secured to the upper and lower sides 62 of a rectangular frame 63 substantially as long as the horizontal width of the duct but substantially narrower than the spacing of the walls 60, 61 so as to define the upstream opening ends of the static chambers 16'. The latter are closed at their downstream ends by the bars 24' and at the sides by the upright walls 64 which are spanned by the sheets 14', 15' and along which the side edges of the sheets wipe during the variable inward bulging of the sheets.

To support the upstream ends of the sheets, two springs 17' laterally spaced across the duct are anchored at their downstream ends to crossbars 65 of the frame 63 and secured at their other ends to a bar 66 to which the nut 30' is welded. The screw 34' threads through the nut and as before is journaled in the target plate 35' which is rectangular in shape but substantially smaller than the cross-section area of the duct. This plate is secured to spaced bars 67 extending across the duct. By turning the knob 38', the nut and the frame bar 62 may be advanced up or down stream to vary the tension of the springs and therefore the volumetric rate of air flow through the variable area passage 13' between the sheets 14', 15'.

Turbulence in the air stream at the discharge end of the passage 13' is minimized by extending across the duct between the walls 64 a relatively thick bar 70 having a generally semi-cylindrical upstream edge surface 71, the downstream edge portion having surfaces 72 which converge to a narrow arcuate edge 73. Such streamlined contour provides for a smooth flow of the air out of the passage 13' which insures even distribution of the air stream across the duct and beyond the bar.

The combined areas of the passage 13' provide the restriction above described for initiating inward bulging of the sheets 14' and 15' when air under pressure is admitted through the inlet pipes 11'. That is to say, the change in the velocity of flow through the restriction causes a drop in static pressure between the chambers 16' and the passage 13' and a corresponding throttling of the air flow through the latter until the resulting downstream pull on the frame 63 due to such bulging just balances the force of the springs 17'. By thus adjusting the bulging of the sheets in accordance with changes in the supply pressure and therefore the static pressure drop between opposite sides of the sheets, the desired constant volumetric flow of air through the duct is maintained at all times, such flow being determined by the adjusted force of the springs 17'.

MODIFICATION—FIG. 7

Figure 7:
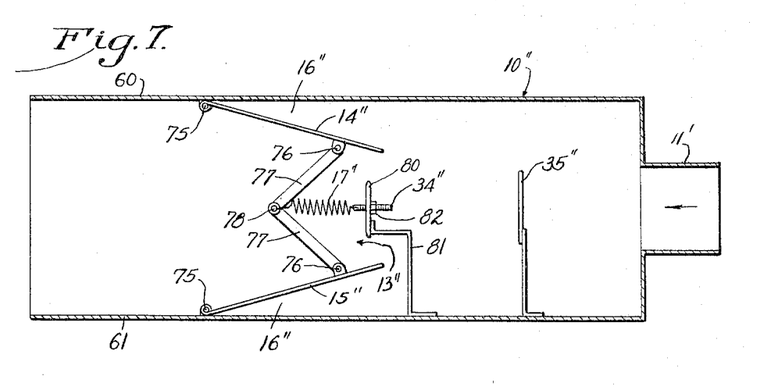
FIG. 7 is a view similar to FIG. 2 of a modification.

In this modification, which is similar in construction to the modification just described, the automatic throttling action and constant volumetric control of the air flow is achieved by applying the static pressure drop between opposite sides of sheets 14" and 15" sized between shaped the same as the sheets 14' and 15' above described but composed of relatively rigid but lightweight material such as aluminum. The downstream ends of the sheets are hinged at 75 to the top and bottom walls 60, 61 of the rectangular duct 10".

The sheets converge upstream so as to define static chambers 16" with the opposed duct walls. Intermediate their up and downstream edges, the sheets are pivoted at 76 to the outer ends of toggle links 77 converging in the downstream direction and joined at their inner ends by a pivot 78. One end of a balancing spring 17" is anchored on the pivot while the upstream end is attached to a screw 34" journaled in a plate 80 centrally supported in the duct by a bracket 81. By adjusting a nut 82 along the screw, the tension of the spring may be varied as desired and therefore the force urging the sheets 14", 15" outwardly.

As in the forms previously described, the spring 17" and the links 76 thus support the sheets 14", 15" for movement toward and away from each other in response to changes in the static pressure drop between the chambers 16" and the passage 13" between the sheets whose upstream edges 21" cooperate with the duct walls to define the passage restriction which causes the static pressure drop in the manner previously described. As a result, the sheets are swung toward and away from each other in accordance with changes in the supply pressure and thus operate to maintain a constant volumetric flow through the duct. Such action, as before, is facilitated by a target plate 35" spaced downstream from and opposite the supply ducts 11'.

MODIFICATION—FIGS. 11 AND 12

Figure 11:
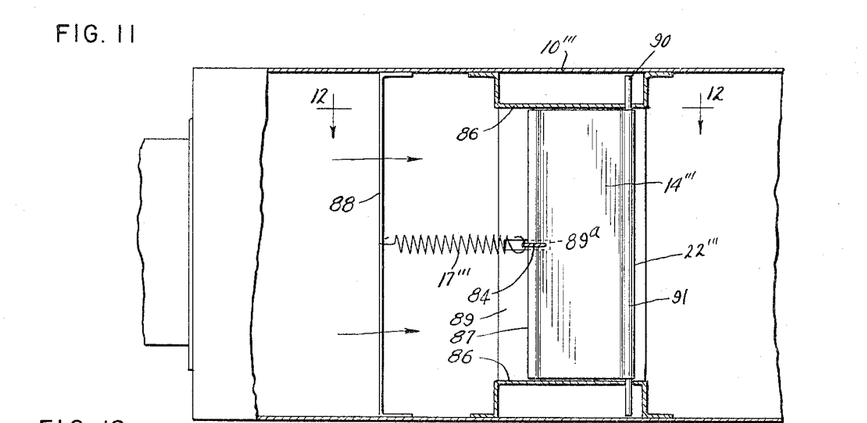
FIG. 11 is a fragmentary cross-section similar to part of FIG. 10 showing another modification.
Figure 12:
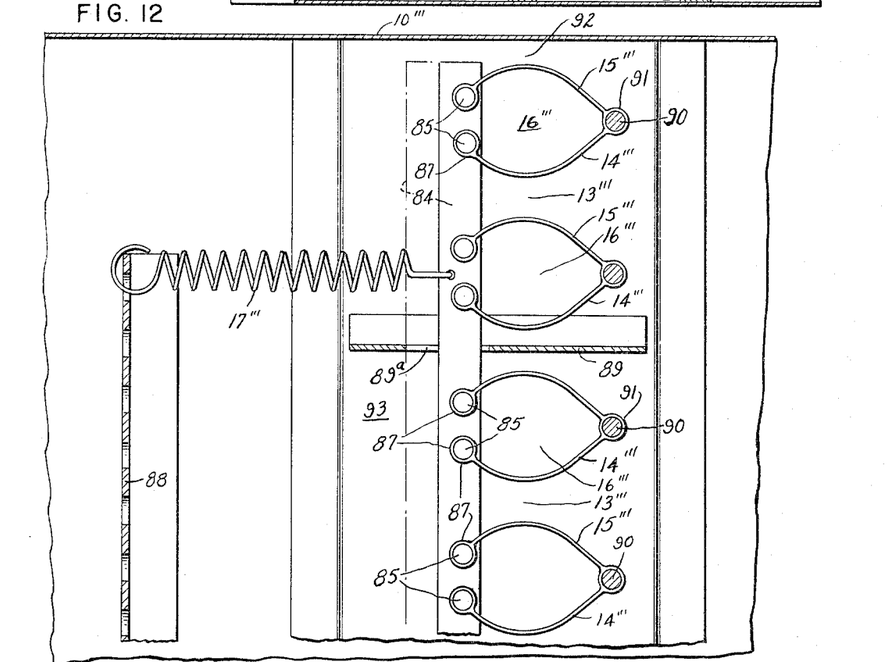
FIG. 12 is a fragmentary cross-section taken along the line 12—12 of FIG. 11.

In this form, which is generally similar to the modification shown in FIGS. 8 to 10, the parts corresponding to those of the forms previously described are indicated by the same but triple-primed reference numbers. The duct 10''' is of rectangular cross-section and is supplied with conditioned air through an inlet pipe to flow from left to right through the duct as indicated by the arrows in the drawings.

Again, the partitions 14''' and 15''' are rectangular sheets composed of flexible imperforate material with their downstream edges secured to a fixed support and their upstream edges secured to a movable support 84 spring-urged upstream to hold the sheets taut between the movable support and the fixed support. In this instance, however, there are a plurality of pairs of sheets spaced apart transaxially of the duct with the sheets of each pair cooperating to define a closed-end static pressure chamber 16''' between their adjacent sides and two longitudinal air passages 13''' around the remote sides of the sheets. With this arrangement, the adjacent sheets of adjacent pairs bulge towards each other to vary the area of the passage between the pairs in response to the pressure differential between the static pressure chambers and the passages in the same manner as do the sheets 14' and 15'.

Herein, the movable support 84 is an elongated bar centered between the sidewalls of the duct 10''' as shown in FIG. 11 with its upper and lower ends spaced from the upper and lower duct walls for free back and forth movement of the bar longitudinally of the duct. Spaced along the bar are a plurality of holes through which crossbars 85 perpendicular to the support bar extend, the opposite ends of these crossbars being slidable along the parallel guide walls 86 of channel-shaped inserts fastened to the duct sidewalls. The crossbars are telescoped through loops 87 forming the upstream edges of the sheets 14''' and 15''' and thus secure the sheets to the support bar.

To urge the support bar upstream, two coiled contactile springs 17''' are connected to the bar at points spaced along the latter and are stretched between the bar and a perforated plate 88 mounted in the duct in front of the bar. Preferably, two slotted guide plates 89 are spaced along the support bar and secured at their ends to the walls 86 with the bar extending through elongated slots 89a which permit back and forth movement of the support bar while preventing tilting of the latter from side to side.

The support for the downstream edges 22''' herein comprises similar crossbars 90 telescoped through loops 91 formed integrally with the two sheets 14''' and 15''' of each pair to close the downstream ends of the static pressure chambers 16'''. The opposite ends of these crossbars project through holes in the guide walls 86 (see FIG. 11) and thus are secured to the duct in fixed positions. The springs 17''' hold the sheets of each pair taut between the bars 85 and 90 to define chambers of V-shaped cross-section longitudinally of the duct with apexes at the bars 90, but are yieldable to permit relative movement of the two supports and bulging of the sheets away from each other in the manner shown in FIG. 12.

Accordingly, the two sheets closest to the ends of the support bar 84 will cooperate with the adjacent duct walls in defining two passages 92 whose areas are varied by bulging of the sheets toward the duct walls, while the remaining passages 13''' are defined between two flexible sheets. The perforated plate 88 serves the purpose of deflecting part of the oncoming air outwardly around the plate while admitting the remainder of the air through the perforations, thereby distributing the air substantially uniformly in the space 93 between the plate and the sheets.

With this arrangement, any desired number of spaced longitudinal passages 13''' may be defined within the duct simply by providing an appropriate number of pairs of sheets 14''' and 15''' supported in the manner described above. The pressure differential between the static pressure chambers 16''' and the associated passages 13''' and 92 bulges the sheets into the passages as permitted by yielding of the movable support 84 until the downstream force produced by the pressure differentials balances against the spring force. When the supply pressure changes, the pressure differential changes correspondingly to vary the bulging of the sheets and the total area of the passages 13''' and 92 by an amount correlated with the pressure change. As a result, the volume of flow through the passages remains substantially constant.

It will be apparent that the invention, in the several forms described, provides for automatic and constant volume regulation of the air flow through a duct by structures which are substantially simpler and less costly to manufacture and possess larger air flow capacity for a given duct size than those of the prior constructions, including the patented construction above referred to. Such simplification, it will be observed, results from supporting the two sheet-like members 14 and 15, 14' and 15', 14'' and 15'' or 14''' and 15''' for movement toward and away from each other by movement of a support axially of the duct against the force of a simple and readily adjustable tension spring in response to changes in the pressure differential on opposite sides of the member.

I claim as my invention:

1. For maintaining a constant volume flow of air through a duct in spite of variations in the supply pressure, the combination with said duct of, two imperforate sheets extending along and disposed in opposed spaced relation within said duct so as to define between them an air passage of smaller transverse area than said duct and extending longitudinally thereof, a support for said sheets mounted for back and forth movement along the axis of said duct and spacing the upstream edges of the sheets inwardly from the inner wall of the duct, means hinging the downstream edges of said sheets to and sealing the same against said wall for free swinging of the upstream portion of said sheets within said duct whereby to define between each sheet and the opposed duct wall a chamber which is open at the upstream end and closed at the downstream end, the inward and outward swinging of said sheets being accompanied by movement of said support along said duct in downstream and upstream directions respectively, an extension spring stretched between said support and said duct upstream from said support and yieldably urging said support upstream, said passage having a restricted area therein to create a drop in the static pressures between said chambers and the passage whereby to induce inward swinging of the sheets and a corresponding reduction in the air flow through said passage until the net inward pressure on said sheets urging said support downstream balances the force of said extension spring.

2. An air flow regulator as defined in claim 1 including a target plate smaller than the inlet end of said passage and centered within said duct upstream from the passage inlet so as to intercept a portion of the oncoming air stream and deflect the same outwardly toward the inlets of said chambers.

3. An air flow regulator as defined in claim 1 in which said duct is rectangular in cross-section and said imperforate sheets are composed of flexible material adapted to bulge inwardly varying amounts in accordance with changes in said static pressure drop.

4. An air flow regulator as defined in claim 1 in which said duct is rectangular in cross-section and said imperforate sheets are composed of relatively rigid material converging upstream and connected by links of an axially flexible toggle urged toward straightened position by said extension spring.

5. An air flow regulator as defined in claim 1 in which said duct is of circular cross-section and said imperforate sheets are composed of freely flexible material and of semi-circular cross-section, the sheets being joined at their edges to form an elongated tube expandable and contractible intermediate its ends and around its entire circumference in response to decreases and increases in said static pressure drop.

6. An air flow regulator as defined in claim 1 in which said restricted area of the air passage is defined by perforated plates arranged face to face and adapted for relative adjustment transversely of said duct to vary the area of registration of the holes in the plates.

7. For maintaining a constant volume of air flowing through a duct in spite of variations in the supply pressure, the combination with said duct of, an elongated tube of freely flexible material smaller than the duct disposed within the latter and defining an axially extending air passage, a support for the upstream end of said tube spacing the same inwardly from the inner wall of the duct and mounting such end for movement longitudinally of the duct, means securing the downstream end of said tube to and sealing the same against said wall whereby to define between the tube and said wall a tubular chamber which is open at the upstream end and closed at the downstream end, and a spring acting between said support and said duct and yieldably urging said support upstream, said passage having a restricted area creating a drop in the static pressures between said chamber and said passage to induce inward bulging of the tube intermediate its ends and a corresponding reduction in the flow of air through said tube until the net radial pressure on said tube bulging the latter inwardly and urging said support downstream balances the force of said spring.

8. An air flow regulator as defined in claim 7 including a means disposed in said duct upstream from said support and acting on the oncoming air impinging against the same to deflect such air outwardly toward the inlet of said tubular chamber.

9. An air flow regulator as defined by claim 8 in which said deflecting means comprises a target disk smaller than and partially covering the upstream end of said tube.

10. For maintaining a constant volume flow of air through a duct in spite of variations in the supply pressure, the combination with said duct of, a plurality of pairs of sheets composed of flexible material spaced apart transaxially of said duct and disposed in planes extending longitudinally of the duct with the downstream edges of the sheets of each pair joined together to define a pressure chamber between the sheets, and with adjacent sheets of adjacent pairs spaced apart to define between them a restricted longitudinal air passage of smaller transverse area than the area of the duct, a first support for the upstream edges of said sheets holding the latter in spaced relation with each other, a second support for the downstream edges of said sheets holding adjacent sheets of adjacent pairs in spaced relation with each other, one of said supports being movable longitudinally of said duct toward the other to permit bulging of the sheets of each pair away from each other in response to pressures in said chambers greater than the pressures in said passages, and spring means yieldably urging said movable support away from said other support whereby said greater pressures induce bulging of said sheets and corresponding reductions in the areas of said passages in response to increases in the supply pressure until the force on said movable support balances against the force exerted by said spring means.

11. The combination defined in claim 10 in which the downstream edges of the two sheets forming each of said chambers converge downstream and are joined together at an apex to form a chamber of V-shaped cross-section longitudinally of the duct.

12. For maintaining a constant volume flow of air through a duct in spite of variations in the supply pressure, the combination with said duct of, two flat sheets composed of freely flexible material extending along and disposed in opposed spaced relation in said duct to define between the adjacent sides of the sheets a restricted air passage of smaller transverse area than the area of said duct and extending longitudinally thereof, a first support for the upstream edges of said sheets holding said edges in spaced relation with each other and with the wall of said duct, means cooperating with said sheets to define pressure chambers on the remote sides of the sheets opening upstream and closed at the downstream ends, a second support for the downstream edges of said sheets, one of said supports being mounted in a fixed position in said duct and the other support being movable toward and away from said fixed support to permit bulging of said sheets toward each other in response to pressures in said chambers greater than the pressure in said passage, and means yieldably urging said movable support away from said fixed support, said passage having a restricted area therein to create a drop in the static pressure between said chambers and said passage whereby to induce bulging of said sheets toward each other and a corresponding reduction in the area of said passage in response to increases in the supply pressure until the net force on said movable support balances against the force of the means urging the movable support away from the fixed support.

13. The combination defined in claim 12 in which said chamber defining means comprises two additional flexible sheets having upstream edges joined to said first support between the upstream edges of the first-mentioned sheets and the duct wall and downstream edges carried by said second support in spaced relation with the duct wall and joined to the downstream edges of said first sheets thereby to form the sides of two additional variable area passages extending between the duct wall and said additional sheets.

14. For maintaining a constant volume flow of air through a duct in spite of variations in supply pressure, the combination with said duct of, two sheets extending along and disposed in opposed spaced relation in said duct to define between the adjacent sides of the sheets a restricted air passage of smaller transverse area than said duct and extending longitudinally thereof, a support for the upstream edges of said sheets mounted for back and forth movement longitudinally of said duct and spacing said upstream edges inwardly from the wall of the duct, means cooperating with said sheets to define chambers on the remote sides of the sheets opening upstream and closed at the downstream ends, means hinging the downstream edges of said sheets for free swinging of upstream portions thereof toward and away from each other to vary the effective area of the passage between the sheets, the inward and outward swinging of said sheets being accompanied by movement of said support along said duct in downstream and upstream directions, respectively, and a spring spaced from said sheets and acting between said duct and said support to urge the support upstream and thereby yieldably resisting inward swinging of said sheets, said passage having a restricted area therein to create a drop in the static pressures between said chambers and the passage whereby to induce inward swinging of the sheets and a corresponding reduction in air flow through said passage until the net downstream force on said support balances against the force of the spring urging said support upstream.

References Cited by the Examiner
UNITED STATES PATENTS

| | | | |
|---|---|---|---|
| 2,781,058 | 2/1957 | Warhus | 138—45 |
| 2,890,716 | 6/1959 | Werder | 137—517 |
| 2,906,287 | 9/1959 | Kreuttner | 137—439 |
| 3,000,395 | 9/1961 | Waterfill | 137—525.5 |

LAVERNE D. GEIGER, *Primary Examiner.*

C. HOUCK, *Assistant Examiner.*